(12) United States Patent
Dutta et al.

(10) Patent No.: US 9,288,053 B2
(45) Date of Patent: Mar. 15, 2016

(54) SCHEMA SIGNING

(71) Applicant: Microsoft Corporation, Redmond, WA (US)

(72) Inventors: Tanmoy Dutta, Redmond, WA (US); Raul Garcia, Kirkland, WA (US); Steven Richard Gott, Bellevue, WA (US); Ruslan Pavlovich Ovechkin, Sammamish, WA (US); Roger Lynn Wolter, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/461,475

(22) Filed: Aug. 18, 2014

(65) Prior Publication Data

US 2014/0372764 A1 Dec. 18, 2014

Related U.S. Application Data

(63) Continuation of application No. 11/519,274, filed on Sep. 12, 2006, now Pat. No. 8,850,209.

(51) Int. Cl.
*H04L 29/06* (2006.01)
*H04L 9/32* (2006.01)

(52) U.S. Cl.
CPC .............. *H04L 9/321* (2013.01); *H04L 9/3247* (2013.01); *H04L 2209/80* (2013.01)

(58) Field of Classification Search
CPC ....................................................... H04L 9/321
See application file for complete search history.

(56) References Cited

U.S. PATENT DOCUMENTS

| | | |
|---|---|---|
| 5,138,712 A | 8/1992 | Corbin |
| 6,453,310 B1 | 9/2002 | Zander |
| 6,567,917 B1 | 5/2003 | Ziese et al. |
| 6,578,037 B1 * | 6/2003 | Wong ................ G06F 17/30471 707/694 |
| 6,671,805 B1 | 12/2003 | Brown et al. |
| 6,768,989 B2 | 7/2004 | Jameson |
| 6,779,117 B1 | 8/2004 | Wells |
| 6,796,489 B2 | 9/2004 | Slater et al. |
| 6,920,567 B1 | 7/2005 | Doherty et al. |
| 6,944,772 B2 | 9/2005 | Dozortsev |
| 7,073,062 B2 | 7/2006 | Leung |
| 7,082,435 B1 | 7/2006 | Guzman et al. |
| 7,093,134 B1 * | 8/2006 | Gong ............................. 713/180 |
| 7,373,520 B1 * | 5/2008 | Borthakur et al. ............ 713/189 |
| 7,437,717 B1 | 10/2008 | Cowan et al. |

(Continued)

OTHER PUBLICATIONS

Martin, James, "Computer Data-Base Organization", 1977, 4 pages.

(Continued)

*Primary Examiner* — Morshed Mehedi
(74) *Attorney, Agent, or Firm* — Aneesh Mehta; Kate Drakos; Micky Minhas

(57) ABSTRACT

In one embodiment, an object in a database schema may be verified as having a valid digital signature associated with a trusted entity. An application may be permitted access to the object of the database schema only when the object of the database schema is verified to have a valid digital signature associated with the trusted entity. In another embodiment, an object in a database schema may be verified as having a digital signature associated with at least one trusted entity. An application may be permitted access to the object of the database schema only when the digital signature for the object is verified to be associated with the at least one trusted entity.

20 Claims, 8 Drawing Sheets

(56) References Cited

U.S. PATENT DOCUMENTS

| | | | |
|---|---|---|---|
| 7,487,515 B1* | 2/2009 | Jones | G06F 17/2247 715/239 |
| 7,941,522 B2* | 5/2011 | Hughes et al. | 709/224 |
| 8,082,349 B1 | 12/2011 | Bhargava et al. | |
| 8,132,261 B1 | 3/2012 | Simpson et al. | |
| 8,312,431 B1* | 11/2012 | Moffat et al. | 717/126 |
| 2003/0028761 A1 | 2/2003 | Platt | |
| 2003/0033521 A1 | 2/2003 | Sahlbach | |
| 2004/0186998 A1 | 9/2004 | Kim et al. | |
| 2004/0244012 A1 | 12/2004 | Massarenti | |
| 2004/0250071 A1 | 12/2004 | Higashiura et al. | |
| 2004/0250086 A1 | 12/2004 | Maucher | |
| 2005/0060266 A1 | 3/2005 | DeMello et al. | |
| 2005/0091532 A1 | 4/2005 | Moghe | |
| 2005/0114670 A1 | 5/2005 | Bowe et al. | |
| 2005/0132201 A1 | 6/2005 | Pitman et al. | |
| 2005/0182958 A1 | 8/2005 | Pham et al. | |
| 2005/0192921 A1 | 9/2005 | Chaudhuri et al. | |
| 2005/0283610 A1 | 12/2005 | Serret-Avila et al. | |
| 2006/0031941 A1 | 2/2006 | Xiao et al. | |
| 2006/0069801 A1 | 3/2006 | Rich et al. | |
| 2006/0107059 A1 | 5/2006 | Lewis et al. | |
| 2006/0179320 A1 | 8/2006 | Berringer et al. | |
| 2006/0282429 A1 | 12/2006 | Hernandez-Sherrington et al. | |
| 2007/0016533 A1 | 1/2007 | Fujimura | |
| 2007/0074034 A1 | 3/2007 | Adams et al. | |
| 2007/0100994 A1 | 5/2007 | Armstrong et al. | |
| 2008/0201781 A1 | 8/2008 | Choi et al. | |
| 2009/0150968 A1 | 6/2009 | Ozzie et al. | |
| 2010/0250729 A1* | 9/2010 | Morris | H04L 67/02 709/224 |

OTHER PUBLICATIONS

"Webwasher CSM Suite: Proactive Security", Aug. 9, 2004, 28 pages.

Demurjian, et al., "Middeware Security", 2004, 21 pages.

Wallach, et al., "Extensible Security Architectures for Java", 1997 ACM, 14 pages.

U.S. Appl. No. 11/519,274, Non Final Office Action Mailed Sep. 17, 2009, 54 pages.

U.S. Appl. No. 11/519,274, Response to Non Final Office Action Mailed Sep. 17, 2009 filed Dec. 15, 2009, 9 pages.

U.S. Appl. No. 11/519,274, Final Office Action Mailed Apr. 1, 2010, 58 pages.

U.S. Appl. No. 11/519,274, Response/Notice of Appeal to Final Office Action Mailed Apr. 1, 2010 filed Sep. 20, 2010, 12 pages.

U.S. Appl. No. 11/519,274, Advisory Action Mailed Oct. 14, 2010, 4 pages.

U.S. Appl. No. 11/519,274, RCE/Response to Final Office Action Mailed Apr. 1, 2010 filed Dec. 2, 2010, 25 pages.

U.S. Appl. No. 11/519,274, Non Final Office Action Mailed Oct. 1, 2012, 53 pages.

U.S. Appl. No. 11/519,274, Response to Non Final Office Action Mailed Oct. 1, 2012 filed Feb. 1, 2013, 20 pages.

U.S. Appl. No. 11/519,274, Final Office Action Mailed Apr. 9, 2013, 52 pages.

U.S. Appl. No. 11/519,274, RCE-Response to Final Office Action Mailed Apr. 9, 2013 filed Jul. 10, 2013, 25 pages.

U.S. Appl. No. 11/519,274, Non Final Office Action Mailed Jul. 30, 2013, 44 pages.

U.S. Appl. No. 11/519,274, Response to Non Final Office Action Mailed Jul. 30, 2013 filed Dec. 2, 2013, 22 pages.

U.S. Appl. No. 11/519,274, Final Office Action Mailed Feb. 4, 2014, 24 pages.

U.S. Appl. No. 11/519,274, Response to Final Office Action Mailed Feb. 4, 2014 filed May 2, 2014, 18 pages.

U.S. Appl. No. 11/519,274, Notice of Allowance Mailed May 16, 2014, 12 pages.

* cited by examiner

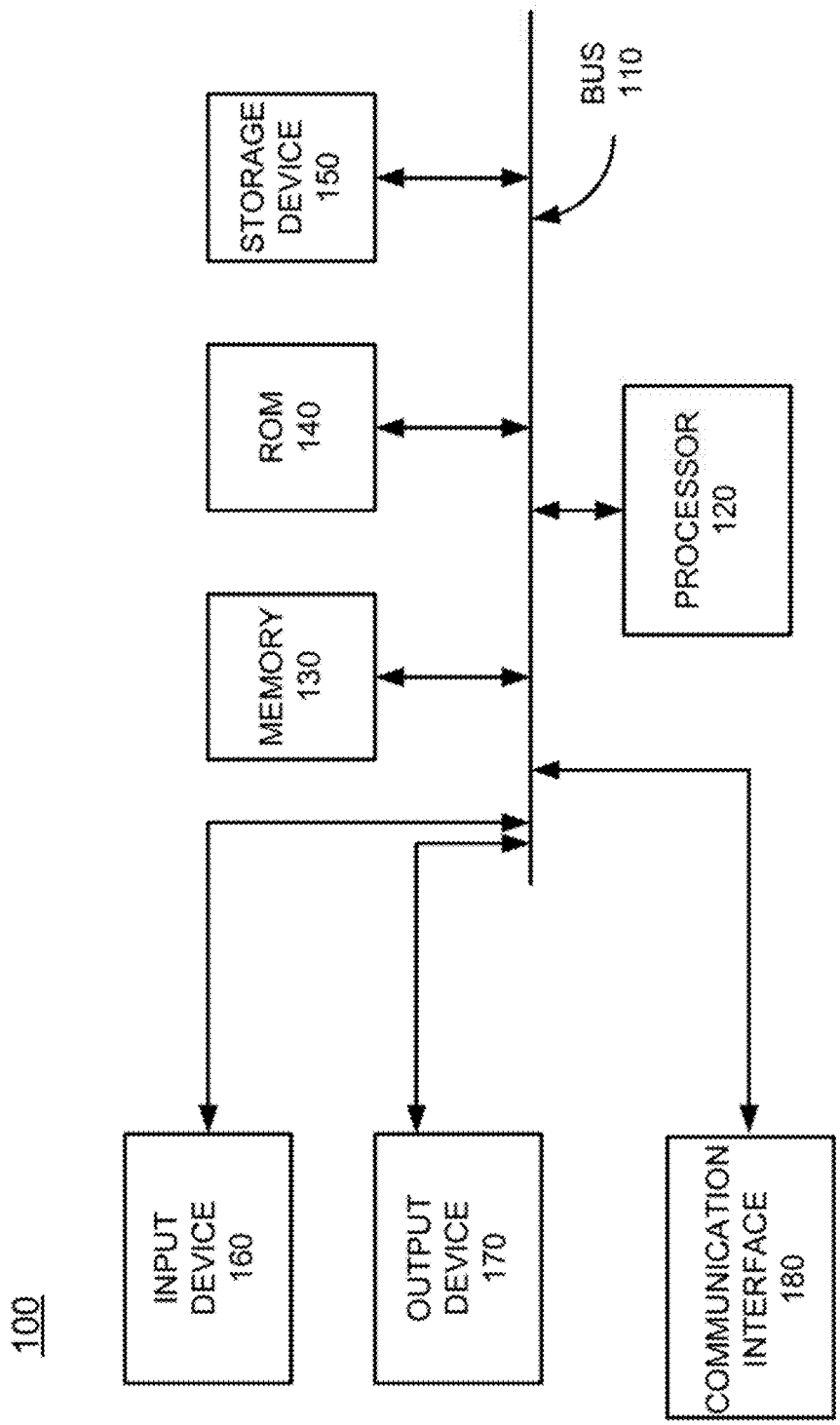

SCHEMA SIGNING

CROSS-REFERENCE TO RELATED APPLICATIONS

This application claims priority to and is a continuation of co-pending U.S. patent application Ser. No. 11/519,274 entitled "Schema Signing" and filed Sep. 12, 2006, which is incorporated herein by reference.

BACKGROUND

At first, database systems were used almost exclusively for large volume data storage. Today, modern database systems help to create an environment of both rich programming capabilities and data storage functionality, including structured data storage functionality. Currently, a growing number of software applications use the structured data storage functionality of database systems. Thus, modern database systems have become a very attractive platform for application development. However, the use of modern database systems for application development also presents some problems.

One problem presented by the use of database systems for application development is the use of the database systems by illegitimate or unauthorized applications. For example, an application may use a database engine to store and manipulate data, such as documents or other data. In some cases, the database engine may not have all the capabilities of some database systems, but may be suitable as a substitute for many database systems. When the application is installed, the database engine is typically installed with the application. However, once installed, the database engine may be used by other applications for which a database usage license was not obtained. Although the application developer may have obtained a database usage license for the application, the other applications may effectively be able to use a database system at no cost. As a result, database vendors may lose revenue when unlicensed applications are permitted to use such database systems.

Another problem presented by the use of database systems is virus propagation or other problems that may be caused by malicious content in database systems. Database systems may be distributed to a large number of client installations and typically have no clear delineation between code and data stored in the database systems. For this reason, it is very difficult to implement a traditional virus scanner to search a database for malicious content or code.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to prevention of unauthorized or illegitimate use of database systems and protection of applications that use databases that may include viruses or other malicious content.

In one embodiment, an object in a database schema may be verified as having a valid digital signature associated with a trusted entity. An application may be permitted to access the object of the database schema only when the object of the database schema is verified as having a valid digital signature associated with the trusted entity. In some implementations of the embodiment, the trusted entity may be a schema publisher, such as an application, or may be a system administrator.

In another embodiment, an object in a database schema may be verified as having a digital signature associated with at least one trusted entity. An application may be permitted to access the object in the database schema only when the digital signature for the object is verified to be associated with the at least one trusted entity. In some implementations of the embodiment, the at least one trusted entity may be a database publisher.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

FIG. 1 is a block diagram of a processing device that may implement embodiments consistent with the subject matter of this disclosure.

DETAILED DESCRIPTION

Figure 2A:
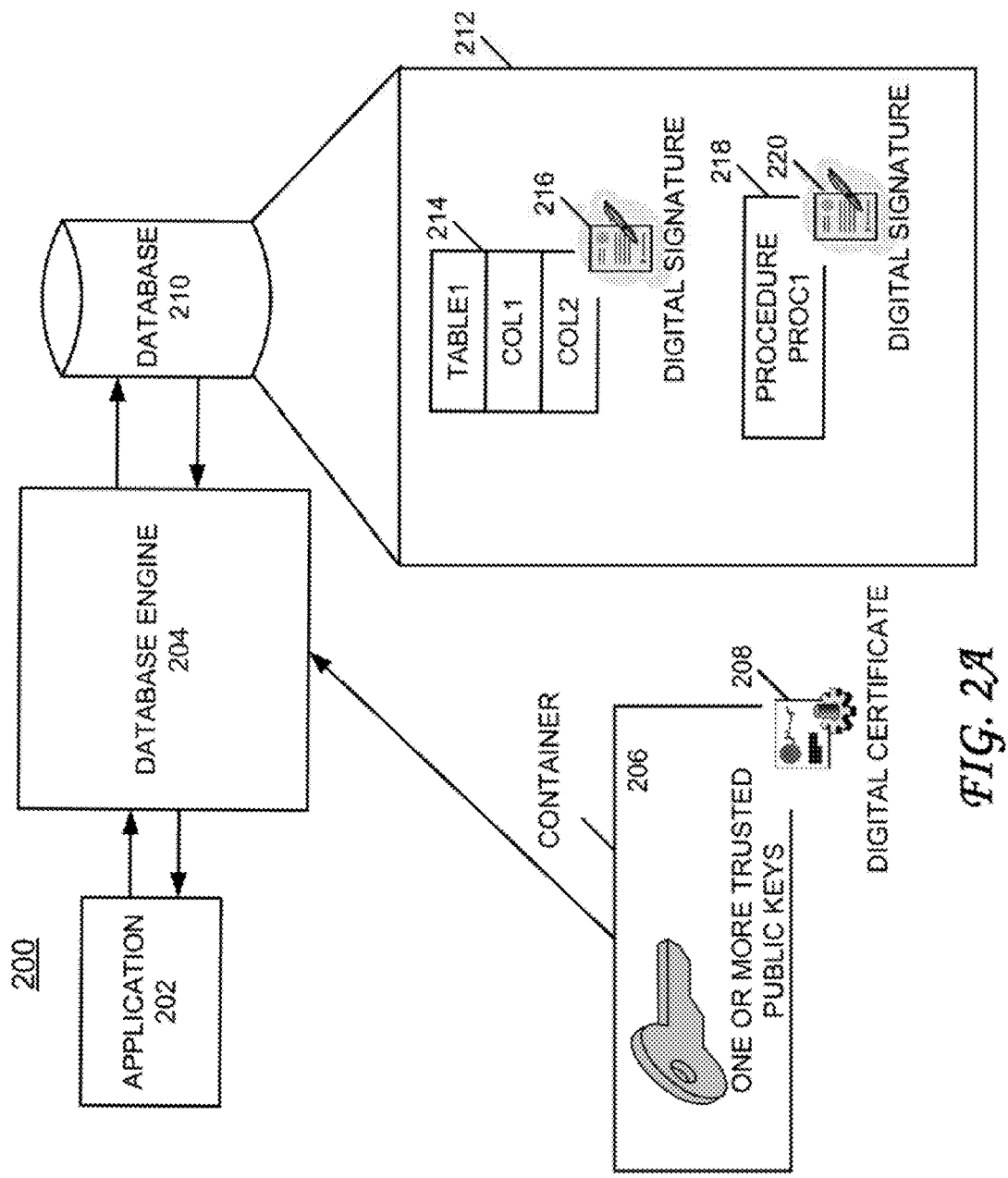
FIG. 2A illustrates a functional block diagram of an embodiment that may be implemented with the processing device of FIG. 1.

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Exemplary Processing Device

FIG. 1 illustrates a functional block diagram of an exemplary processing device 100 which may be used to implement embodiments consistent with the subject matter of this disclosure. Processing device 100 may include a bus 110, a processor 120, a memory 130, a read only memory (ROM) 140, a storage device 150, an input device 160, an output device 170, and a communication interface 180. Bus 110 may permit communication among components of processing device 100. Communication interface 180 may be used in some embodiments to communicate with other processing devices via a network. For example, communications interface 180 may be used to communicate with other processing devices, such as, for example, another processing device 100, in an embodiment having functions distributed across multiple processing devices connected via a wired or wireless network. Further, in some embodiments, communications interface 180 may be used to communicate via a wired or wireless network with one or more software applications executing in one or more physically separate processing devices.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media. In one implementation, storage device 150 may include one or more databases of a database system.

Input device 160 may include one or more conventional mechanisms that permit a user to input information to processing device 100, such as a keyboard, a mouse, or other input device. Output device 170 may include one or more conventional mechanisms that output information to the user, including a display, a printer, or other output device. Communication interface 180 may include any transceiver-like mechanism that enables processing device 200 to communicate with other devices or networks.

Processing device 100 may perform such functions in response to processor 120 executing sequences of instructions contained in a computer-readable medium, such as, for example, memory 130, a magnetic disk, an optical disk, or other medium. Such instructions may be read into memory 130 from another computer-readable medium, such as storage device 150, or from a separate device via communication interface 180.

FIG. 2A is a functional block diagram of an embodiment 200, consistent with the subject matter of this disclosure, which may be implemented on processing device 100 or on multiple processing devices 100 communicating with one another via a network. Embodiment 200 may include an application 202, a database engine 204, a container 206 having a digital certificate 208, and a database 210.

Application 202 may be a software application that accesses database 210 via database engine 204. Application 202 may execute on the same processing device as database engine 204 and database 210, or may be in a physically separate processing device which may communicate to the processing device including database engine 204 and database 210 via a network.

Database engine 204 may be a relational database engine, such as, for example, a SQL database engine, or may be another type of database engine. Database 210 may include an exemplary schema 212. Exemplary schema 212 may include a table object 214 and a procedure object 218. However, in other implementations, schema 218 may include other types of objects, such as, for example, a data object, a function object, a trigger object, a view object, or a binary code object, as well as different or other types of objects. Each of the objects in schema 212 may include a digital signature. For example, table object 214 may include digital signature 216 and procedure object 218 may include digital signature 220.

Container 206 may include one or more public keys of one or more trusted entities. As will be described in more detail below, database engine 204 may only permit access to an object of a schema having a digital signature signed by a private key corresponding to a public key of a trusted entity. In some embodiments, database engine 204 may not permit access to any objects in a schema when an object in the schema does not have a digital signature signed by a private key corresponding to a public key of a trusted entity. In some embodiments, container 206 may be included in application 202. Container 206 may be a well-protected container. A well-protected container may be a container whose contents are protected from alteration, except possibly by certain users, or a container having a digital certificate signed by a trusted authority, such as, for example, an Authenticode® certificate (Authenticode is a registered trademark of Microsoft Corporation of Redmond, Wash.). In an embodiment that includes a container having a digital certificate signed by a trusted authority, a public key of the trusted authority may be persisted in an operating system of a processing device, such as processing device 100, which may execute an implementation of database engine 204.

In some embodiments, container 206 may be included in an attesting dynamic link library (DLL). A DLL is a file which may contain executable code and data bound to a program at load time or run time. An attesting DLL may be a DLL that includes a well-protected container, such as, for example, a container including one or more public keys of one or more trusted entities and may also have a digital certificate of a trusted authority, such as, for example, an Authenticode® certificate or other digital certificate.

In other embodiments, container 206 may be a well-protected container included in a database or an operating system. The well-protected container included in the database or the operating system may include a digital certificate of a trusted authority. In yet other embodiments, container 206 may be an eXtensible Markup Language (XML) file, which may include a digital certificate of a trusted authority.

Although exemplary embodiment 200 shows only one application, other embodiments may include multiple applications which may communicate with database engine 204 and database 210. Further, database 210 may include multiple schemas with a number of different types of objects.

Exemplary Operating Environment

Figure 2B:
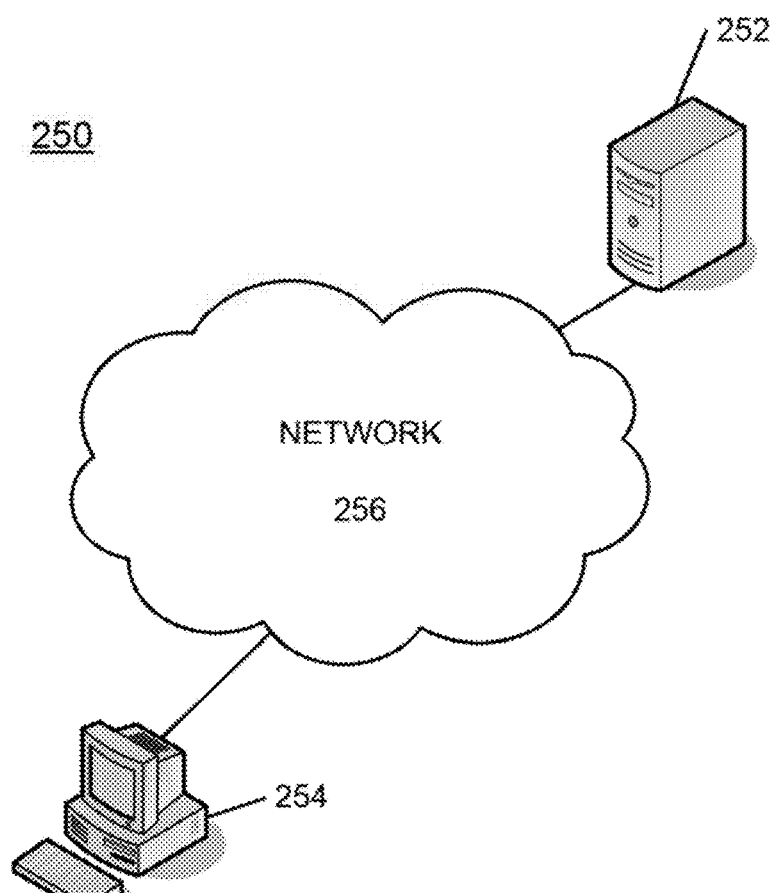
FIG. 2B illustrates an exemplary operating environment that may be used with the embodiment illustrated by FIG. 2A.

FIG. 2B illustrates an exemplary operating environment 250 consistent with the subject matter of this disclosure, which may be used to implement embodiment 200 of FIG. 2A. Exemplary operating environment 250 may include processing device 252, processing device 254, and network 256.

Processing device 252 may be a server or other processing device. In some embodiments, processing device 252 may be implemented by processing device 100 of FIG. 1. Processing device 252 may execute database engine 204 and may include database 210.

Processing device 254 may be a personal computer (PC) or other processing device which communicates with processing device 252 through network 256. In some embodiments, processing device 254 may be implemented by processing device 100 of FIG. 1. Processing device 254 may execute application 202, which is arranged to access database 210 via database engine 204.

Network 256 may be a wired or wireless network and may include a number of devices connected via wired or wireless means. Network 256 may include only one network or a number of different networks, some of which may be networks of different types.

Exemplary Embodiments Including Protection Against Viruses or Malicious Content

With reference to FIGS. 2A and 2B, operation of an exemplary embodiment, which provides protection from malicious database content or viruses will now be described. In this embodiment, application 202 may include container 206. Container 206 may or may not be a well-protected container and, in some implementations, may be included in an application header or other portion of application 202.

In preparation for accessing database 210, application 202 may provide a content of container 206, including one or more public keys of one or more trusted entities, to database engine 204. In this embodiment, a system administrator or a schema publisher, such as, for example, application 202, or both, may be considered to be a trusted entity. In such an embodiment, container 206 may include one or more public keys associated with application 202 or the system administrator. For the sake of discussion of operation of this exemplary embodiment, we assume that, at least, application 202 is considered to be a trusted entity. Application 202 may indicate to database engine 204 a desire to access one or more objects of schema 212 of database 210.

Each object in schema 212 may have a corresponding digital signature. A schema publisher may digitally sign each of the objects of schema 212 when creating or modifying any of the objects of schema 212. Each object may be signed by calculating a hash of a respective object and then applying a private key of the schema publisher to the hash, thereby creating a digital signature. A public key of the schema publisher may be used at a later time to recreate the hash from the digital signature. After an object is digitally signed by the schema publisher, database engine 204 may save a copy of the digital signature of each object for digital signature verification of the object at a later time. In some implementations, the digital signature may be persisted in a system table as a part of database object definition.

The hash of an object in schema 212 may be calculated based upon a type of object. For example, in one implementation, the hash value may be computed based on the following:

Schema name including the object to be digitally signed
Object name
For a table
   For each column in the table in alphabetical order by name
     column name
     column type
     column size
For an object that is an executable module, such as, for example, a procedure object, a function object, or a trigger object
   textual representation of code for the object
For a view object, which includes a procedure for presenting a particular view of data
   textual representation of code for the object
For a binary code object
   binary representation of the code for the object When application 202 attempts to attach database 210 and schema 212, database engine 204 may verify that the objects of schema 212 have valid digital signatures by computing a first hash for each of the objects of schema 212, applying a public key associated with each previously saved copy of the digital signature for each object to create a second hash for each of the objects, and compare each of the first hashes with each corresponding one of the second hashes. When the corresponding first and second hashes are equal, the digital signature for the corresponding object may be verified as a valid digital signature. When an object in a schema has been maliciously tampered with, the digital signature for the object will not be equal to the previously saved digital signature for the object.

Database engine 204 may verify that each of the digital signatures of the objects of schema 212 is signed by a public key associated with one of the one or more public keys of the one or more trusted entities. Database engine 204 may determine whether the digital signature of each of the objects in schema 212 is associated with a trusted entity by comparing a public key associated with the digital signature of each of the objects with the one or more public keys provided by container 206.

In some implementations, database engine 204 may permit application 200 to access only objects in schema 212 that have a valid digital signature with an associated public key that matches the one or more public keys of the one or more trusted entities. Thus, in this implementation, access may be denied to objects that have either an invalid digital signature or a digital signature not associated with any of the one or more public keys of the one or more trusted entities.

In some implementations, database engine 204 may verify the validity of the digital signatures of the objects in the schema and may verify that the digital signatures of the objects in the schema are associated with one or more public keys of one or more trusted entities during or after application 202 attaches database 210 and schema 212.

In yet other implementations, database engine 204 may verify the validity of the digital signatures of the objects in the schema and may verify that the digital signatures of the objects in the schema are associated with one or more public keys of one or more trusted entities before application 202 attaches database 210 and schema 212. In such an implementation, database engine 204 may fail startup of database 210 or may not permit application 202 to attach database 210 and schema 212. In such an implementation, application 202 may provide the one or more public keys included in container 206 to database engine 204 before attempting to attach database 204 and schema 210.

Figure 3:
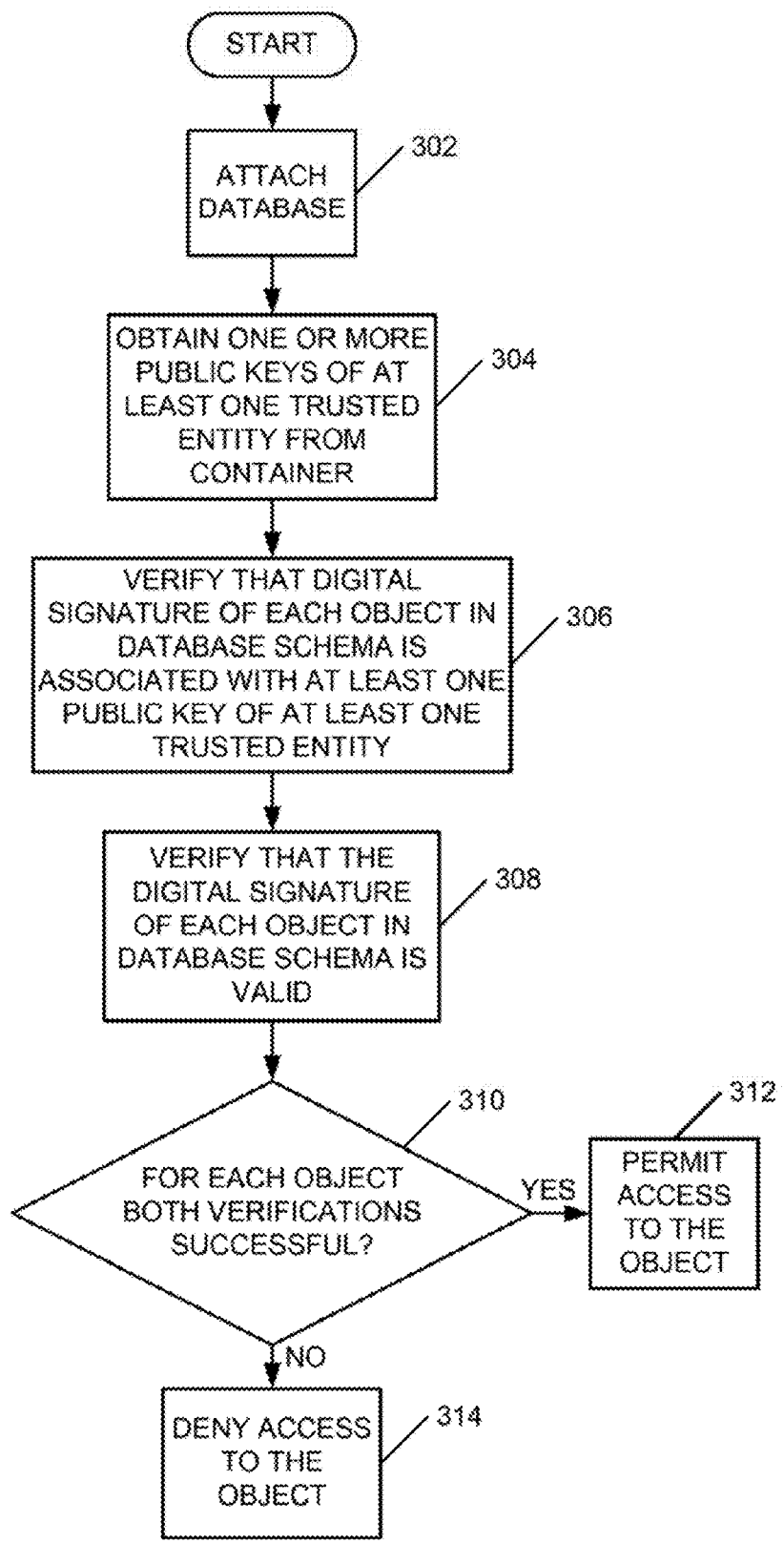
FIGS. 3-7 are flowcharts that illustrate processing in exemplary embodiments consistent with the subject matter of this disclosure.

FIG. 3 is a flowchart that illustrates processing in an exemplary embodiment consistent with the subject matter of this disclosure. As mentioned previously, with respect to FIG. 2B, application 202 may be included in processing device 254 which may communicate with processing device 252 via network 256. Processing device 252 may include database engine 204 and database 210. Alternatively, application 202, database engine 204, and database 210 may be included in one processing device. The process may begin with database engine 204 attaching database 210 and schema 212 in response to a request from application 202 (act 302). Database engine 204 may then obtain one or more public keys of one or more trusted entities provided by application 202 from container 206 (act 304). Database engine 204 may then verify a digital signature of each object of database schema 212 as being associated with the one or more public keys of the one or more trusted entities (act 306). Next, database engine 204 may verify that the digital signature of each of the objects of schema 212 is valid. (act 308).

Figure 4:
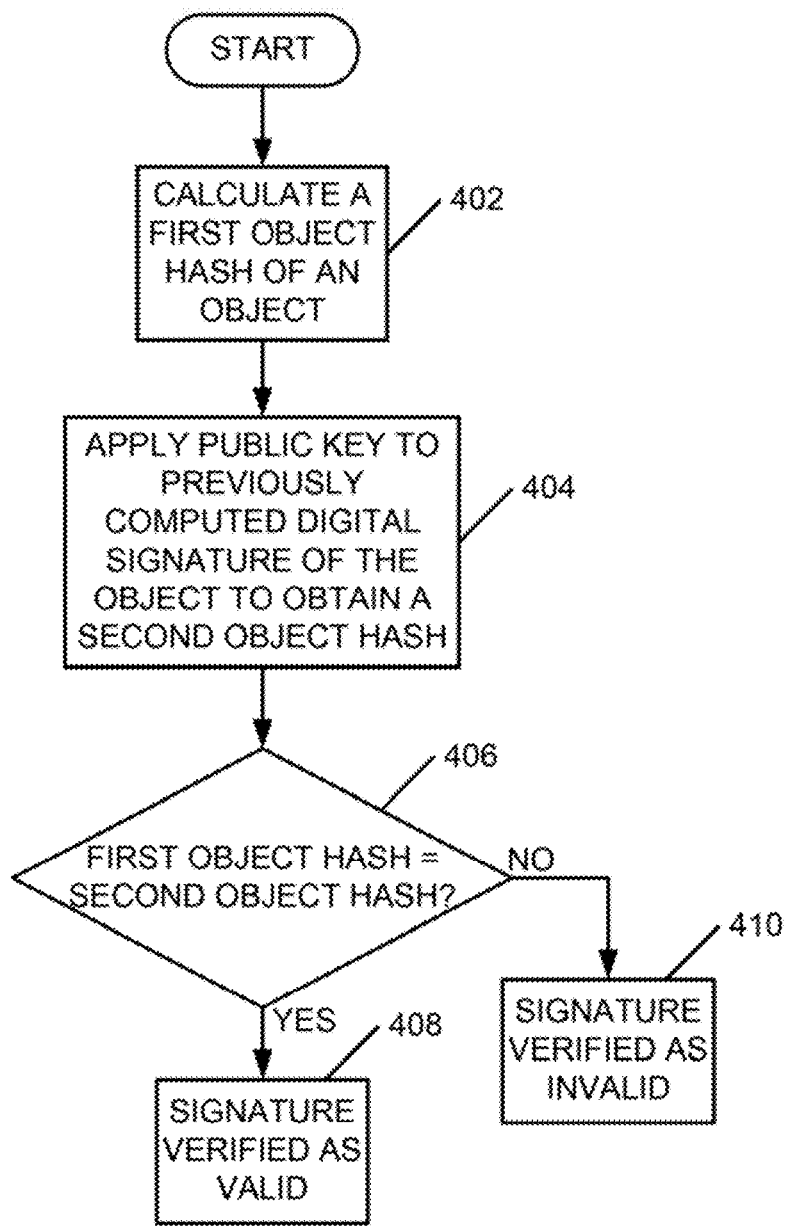

FIG. 4 is a flowchart that illustrates processing that may occur during act 308 when verifying that a digital signature for an object is valid. First, database engine 204 may calculate a first hash of an object in schema 212 (FIG. 4: act 402). The first hash may be calculated using a name of a schema including the object, a name of the object, and other information depending on a type of the object, as previously described. A public key associated with a corresponding previously computed and saved digital signature for the object may be applied to the previously computed and saved digital signature to obtain a second hash (act 404). Database engine 204 may compare the first hash and the second hash (act 406). If the first hash and the second hash are equal, then the digital signature for the object may be verified as valid (act 408). Otherwise, the digital signature for the object may be verified as invalid (act 408).

Returning to FIG. 3, for each of the objects in schema 212, database engine 204 may determine whether the verifications of acts 306 and 308 verify the respective object as having a valid digital signature signed by a private key associated with a public key of one of the one or more trusted entities (FIG. 3: act 310). If the respective object is verified as having a valid digital signature signed by a private key associated with a public key of one of the one or more trusted entities, then database engine 204 may permit application 202 to access to the object (act 312). Otherwise, database engine 204 may deny application 202 access to the object (act 314).

In the implementation of FIG. 3, database engine 204 may permit application 202 to access ones of the objects of schema 212 that have a valid digital signature associated with a pubic key of at least one of the trusted entities, while denying application 202 access to ones of the objects of schema 212 that either have an invalid digital signature or have a digital signature that is not associated with a public key of one of the one or more trusted entities. Thus, if an object in schema 212 is tampered with, the corresponding digital signature will not be verified as valid. If the object is digitally signed after tampering and the new digital signature is saved for later verification of validity, the digital signature may be verified as valid, but the digital signature may not be verified as being associated with a public key of one of the one or more trusted entities, thus preventing application 202 from accessing the corrupted object.

Figure 5:
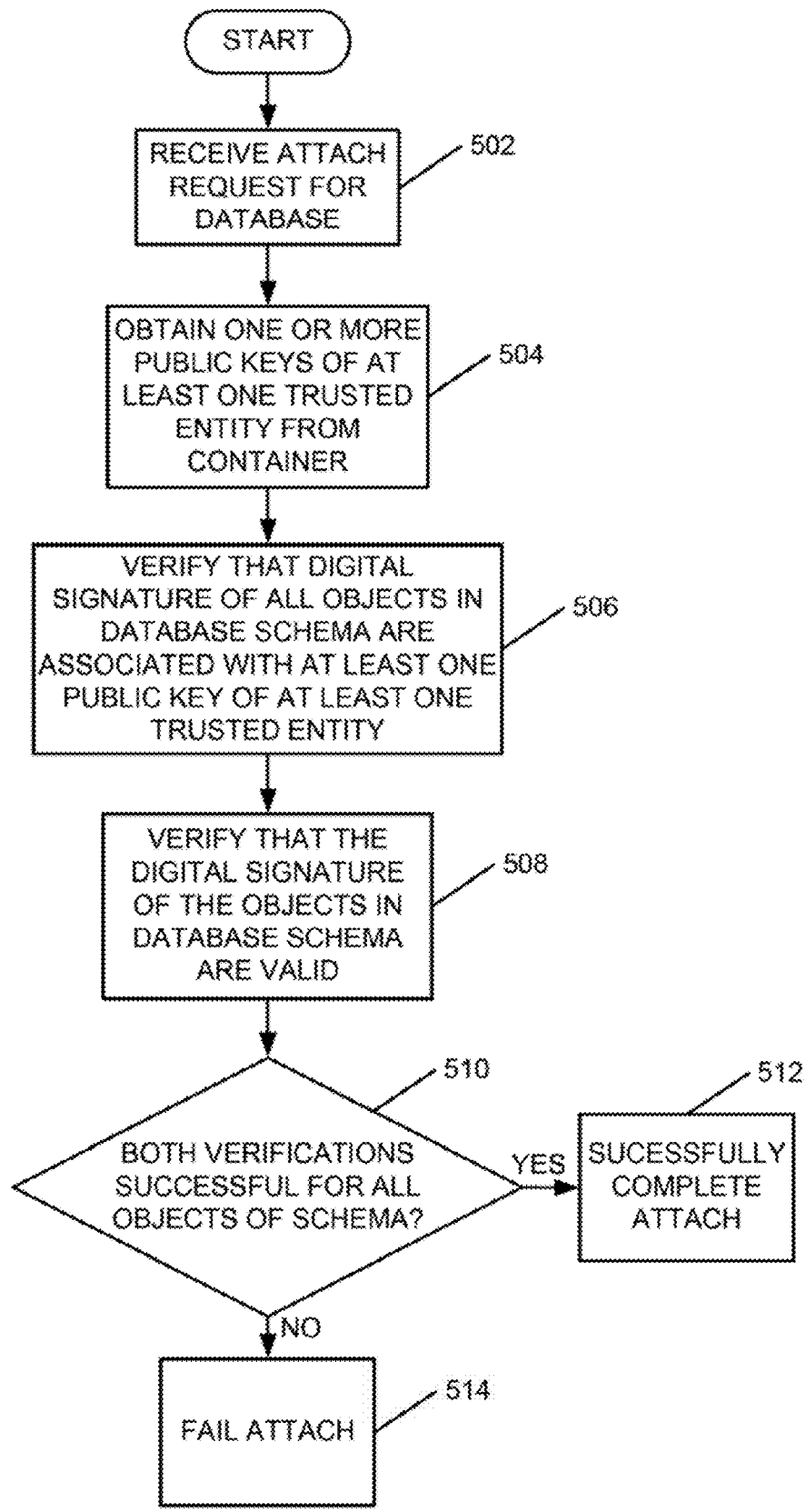

FIG. 5 is a flowchart that illustrates exemplary processing in another embodiment consistent with the subject matter of this disclosure. The process may begin with database engine 204 receiving a request from application 202 to attach database 210 and schema 212 (act 502). Database engine 204 may then obtain one or more public keys of one or more trusted entities provided by application 202 from container 206 (act 504). Application 202 may provide the one or more public keys of the one or more trusted entities to database engine 204 before application 202 requests to be attached to database 210 and schema 212. Database engine 204 may then verify a digital signature of each object of database schema 212 as being associated with the one or more public keys of the one or more trusted entities (act 506). Next, database engine 204 may verify that the digital signature of each of the objects of schema 212 are valid. (act 508). Act 508 may be performed according to acts 402-408 of FIG. 4 or via another method. Database engine 204 may then determine whether the digital signatures of the objects of schema 212 are all valid and are all associated with one or more public keys of one or more of the trusted entities (act 510). If the digital signatures of the objects of schema 212 are all valid and are all associated with one or more public keys of one or more of the trusted entities, then database engine 204 may successfully complete attaching database 210 and schema 212. (act 512). Otherwise, database engine 204 may fail the attach operation of database 210 and may fail a startup of database 210 (act 514).

The exemplary implementations of FIGS. 3 and 5 help protect applications against viruses and malicious database content by not permitting access to objects of a database that do not have a valid digital signature associated with a public key of one or more trusted entities. Thus, if a party with malicious intent managed to break into a database system, modify one or more objects of a schema, and digitally sign the one or more objects with a valid digital signature, the digital signature would not be associated with a public key of one or more trusted entities. Therefore, the tampered-with objects of the schema would not be accessible. Embodiments consistent with the subject matter of this disclosure may operate in an application or user-independent manner. That is, access to objects of a schema may be permitted or denied based on the digital signatures of the objects and not based on the application or user attempting to access the objects.

Exemplary Embodiments for Protecting Against
Unauthorized Use of a Database

With reference to FIGS. 2A and 2B, operation of an exemplary embodiment, which protects against unauthorized use of a database will now be described. As mentioned previously, with respect to FIG. 2B, application 202 may be included in processing device 254 which may communicate with processing device 252 via network 256. Processing device 252 may include database engine 204 and database 210. Alternatively, application 202, database engine 204, and database 210 may be included in one processing device. In this embodiment, container 206 may be included in an attesting DLL, which may have a digital certificate of a trusted authority, container 206 may be included in an XML file, which may have a digital certificate of a trusted authority, or container 206 may be a well-protected container in an operating system of a processing device, such as, for example, processing device 100. Container 206 may include one or more public keys associated with one or more trusted entities, which in embodiments for protecting against unauthorized use of a database may be a database publisher. In some implementations, the database publisher may be the only trusted entity.

As described previously with respect to the embodiments for protecting against viruses or malicious content, each object in schema 212 may have a corresponding digital signature. A trusted entity, such as the database publisher, may digitally sign each of the objects of schema 212 when creating or modifying any of the objects of the schema. Each object may be signed by calculating a hash of a respective object and then applying a private key of the trusted entity to the hash, thereby creating a digital signature. The hash of an object of schema 212 may be calculated in a same manner as described with respect to the embodiments for protecting against viruses or malicious content.

Database engine 204 may verify that each of the digital signatures of the objects of schema 212 are signed by a public key associated with one of the one or more public keys of the one or more trusted entities. Database engine 204 may determine whether the digital signature of each of the objects in schema 212 is associated with a trusted entity by comparing a public key associated with the digital signature of each of the objects with the one or more public keys provided by container 206.

In some implementations, database engine 204 may permit access only to objects in schema 212 that have a digital signature associated with a public key that matches one of the one or more public keys of the one or more trusted entities. Thus, in this implementation, access may be denied to objects that have a digital signature not associated with any of the one or more public keys of the one or more trusted entities.

In other implementations, database engine 204 may deny access to the objects in schema 212 if any of the objects have a digital signature not associated with a public key of one of the one or more trusted entities.

Figure 6:
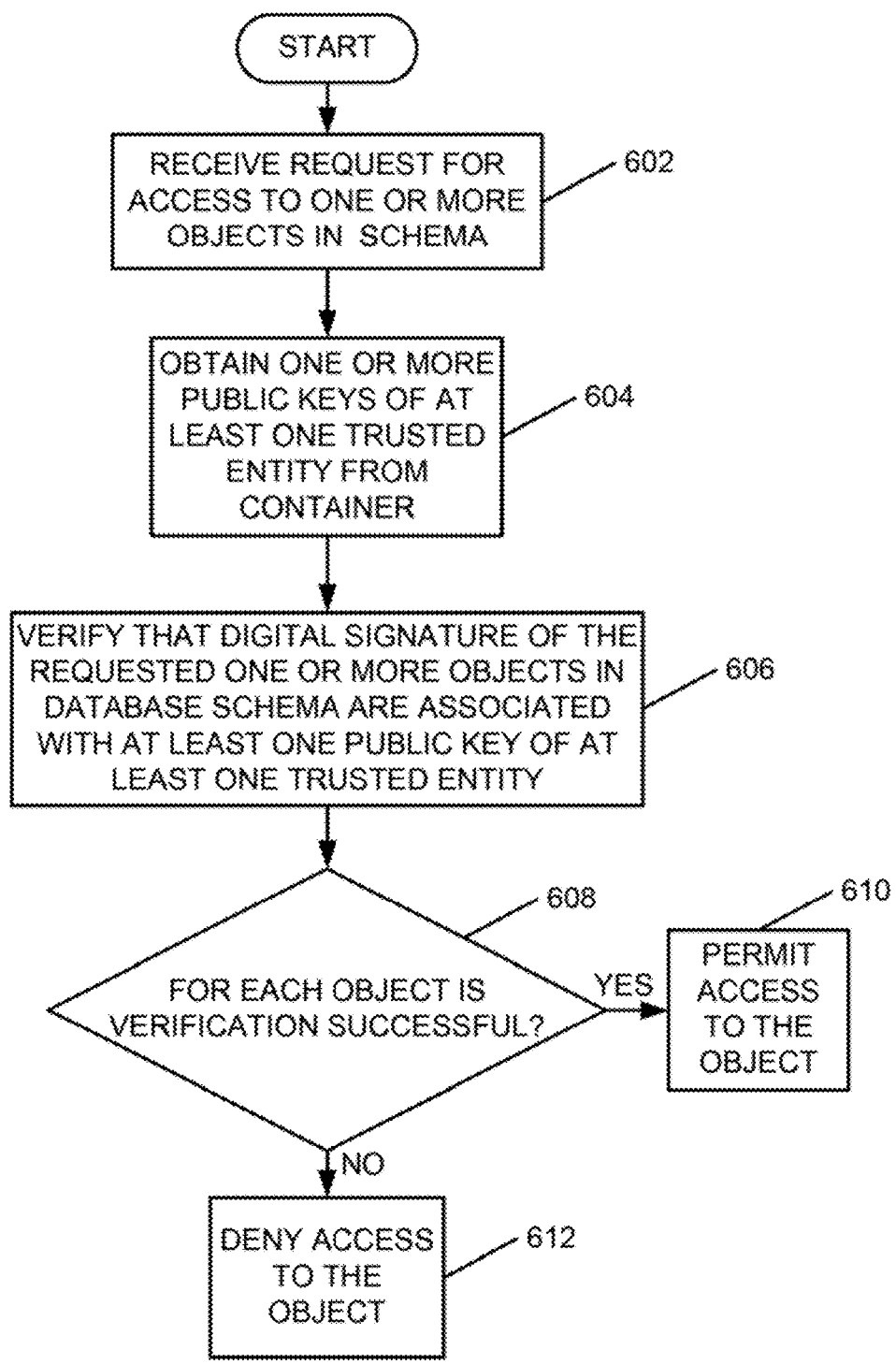

FIG. 6 is a flowchart that illustrates processing in an exemplary embodiment consistent with the subject matter of this disclosure. Sometime after database 210 and schema 212 have been attached to application 202, database engine 204 may receive a request for access to one or more objects in schema 212 from, for example, application 202 (act 602). Database engine 204 may obtain one or more public keys of at least one trusted entity from contain 206, which may be a well-protected container, as described previously (act 604). In this implementation, container 206 may include one or more public keys of one or more trusted entities, such as, for example, database publishers. Database engine 204 may then verify that the digital signature of the requested one or more objects in schema 212 have a digital signature associated with one or more public keys of one or more trusted entities (act 606). Database engine 204 may then determine, for each requested object, whether the verification of each respective digital signature of the one or more objects was successful (act 608). If so, then database engine 204 may permit application 202 to access the object (act 610). Otherwise, database engine 204 may deny application 202 access to the object (act 612).

Figure 7:
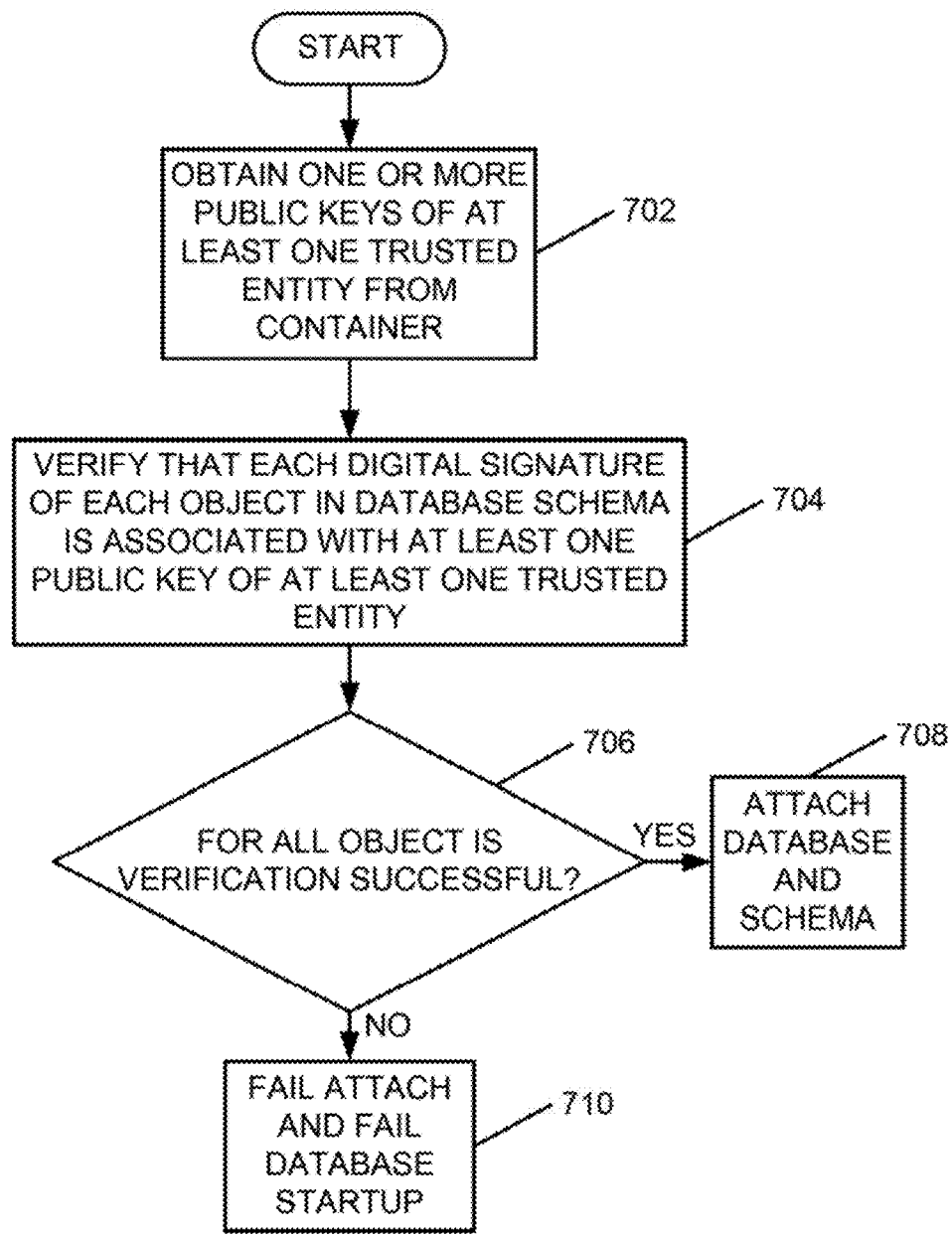

FIG. 7 is a flowchart that illustrates processing in another implementation consistent with the subject matter of this disclosure. The flowchart of FIG. 7 illustrates processing that may occur during an attempt to attach database 210 and schema 212 to an application such as, for example, application 202. First, database engine 204 may obtain one or more public keys of one or more trusted entities from container 206, which may be a well-protected container, such as, for example, a tamper proof container, a container with a digital certificate of a trusted authority, an attesting DLL, an XML file with a digital certificate of a trusted authority, or a well-protected container in a database or operating system (act 702). Database engine 204 may then verify whether each digital signature of each object of schema 212 of database 210 is associated with a public key of the one or more trusted entities (act 704). In this implementation a trusted entity may be, for example, a database publisher. If all objects of schema 212 are verified as having digital signatures associated with a public key of one or more trusted entities (act 706), then database engine 204 may attach database 210 and schema 212 to application 202 (act 708). Otherwise, database engine 204 may fail the attach operation and may fail a startup of database 210 (act 710).

The exemplary embodiments of FIGS. 6 and 7 prevent use of objects of schemas not having a digital signature associated with a trusted entity, such as, for example, a database publisher. Thus, for example, in such embodiments, database engine 204 may not permit schemas with objects not digitally signed by a trusted entity, such as, for example, a database publisher, to be accessible. In this way, applications not authorized or licensed for use with a database may be prevented from accessing objects in a database.

Embodiments consistent with the subject matter of this disclosure may operate in an application or user-independent manner. That is, access to objects of a schema may be permitted or denied based on the digital signatures of the objects and not based on the application or user attempting to access the objects.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above description may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. For example, the flowcharts of FIGS. 3 and 5 show a verification that a digital signature of an object in a schema is associated with a public key of at least one trusted entity being performed before a verification that the digital signature of the object is a valid digital signature. Other implementations may have an order of the verifications reversed. Accordingly, the appended claims and their legal equivalents should only define the invention, rather than any specific examples given.

What is claimed is:

1. A method for verifying trust of at least one object defined in a database schema of a database before permitting access to the at least one object, the method comprising:
   verifying whether or not a digital signature associated with the at least one object defined in the database schema is valid using a hash of the at least one object defined in the database schema calculated based upon a type of the at least one object defined in the database schema;
   determining that the at least one object defined in the database schema has been tampered with if the digital signature of the at least one object defined in the database schema is determined to not be valid; and
   to protect a software application that uses the database from malicious content, denying access to the at least one object defined in the database schema based on a result of determination that the at least one object defined in the database schema has been tampered with.

2. The method of claim 1, wherein:
   the digital signature is created using a private key associated with a public key, and
   the verifying whether or not a digital signature associated with the at least one object is valid further comprises:
   calculating a first object hash of the at least one object,
   applying a public key to a previously computed digital signature for the at least one object to obtain a second object hash, and
   comparing the first object hash with the second object hash, the validity of the digital signature of the at least one object being verified when the comparing determines that the first object hash and the second object hash are equal.

3. The method of claim 1, wherein:
   the verifying whether or not a digital signature associated with the at least one object is valid further comprises verifying the validity of a digital signature of each object of the at least one object, and
   permitting access only to each object of the at least one object having a verified valid digital signature.

4. The method of claim 1, further comprising:
   verifying that a digital signature for the at least one object is associated with a trusted entity comprising:
   comparing a public key associated with the digital signature for the at least one object with a provided public key of the trusted entity, the public key associated with the digital signature of the at least one object being verified as associated with the trusted entity when the comparing indicates that the public key associated with the digital signature for the at least one object is equal to the provided public key of the trusted entity.

5. The method of claim 1, further comprising:
   verifying that a digital signature for the at least one object is associated with a trusted entity comprising:
   comparing a public key associated with the digital signature for the at least one object with a public key of the trusted entity provided in a database or a well-protected container of an operating system, the public key associated with the digital signature for the at least one object being verified as associated with the trusted entity when the comparing indicates that the public key associated with the digital signature for the at least one object is equal to the public key of the trusted entity.

6. The method of claim 1, further comprising:
verifying that a digital signature for the at least one object is associated with a trusted entity comprising:
comparing a public key associated with the digital signature for the at least one object with a public key of the trusted entity provided by an application preparing to use the database, the public key associated with the digital signature for the at least one object being verified as associated with the trusted entity when the comparing indicates that the public key associated with the digital signature for the at least one object is equal to the provided public key of the trusted entity.

7. The method of claim 1, wherein:
each of the at least one object is one of a data object, a table object, a procedure object, a function object, a trigger object, a view object, or a binary code object, and
verifying whether or not a digital signature associated with the at least one object is valid further comprises:
calculating a first object hash for the at least one object,
applying a public key of a previously computed digital signature for the at least one object to the previously computed digital signature for the at least one object to obtain a second object hash, and
comparing the first object hash with the second object hash, the validity of the digital signature of the at least one object being verified when the comparing determines that the first object hash and the second object hash are equal.

8. A machine-readable medium having instructions stored thereon for at least one processor, the machine-readable medium comprising:
instructions for verifying whether or not a digital signature associated with the at least one object defined in a database schema of a database is valid;
instructions for determining that the at least one object defined in the database schema has been tampered with if the digital signature of the at least one object is determined to not be valid using a hash of the at least one object defined in the database schema calculated based upon a type of the at least one object defined in the database schema; and
instructions for, to protect a software application that uses the database from malicious content, denying access to the at least one object based on a result of determination that the at least one object defined in the database schema has been tampered with, wherein the machine-readable medium is an item from a group of items consisting of a memory, a magnetic disk and an optical disk.

9. The machine-readable medium of claim 8, wherein:
the digital signature is created using a private key associated with a public key, and
the instructions for verifying whether or not a digital signature associated with the at least one object is valid further comprise:
instructions for calculating a first object hash of the at least one object,
instructions for applying a public key to a previously computed digital signature for the at least one object to obtain a second object hash, and
instructions for comparing the first object hash with the second object hash, the validity of the digital signature of the at least one object being verified when the comparing determines that the first object hash and the second object hash are equal.

10. The machine-readable medium of claim 8, wherein:
the instructions for verifying whether or not a digital signature associated with the at least one object is valid further comprise instructions for verifying the validity of a digital signature of each object of the at least one object, and
instructions for permitting access only to each object of the at least one object having a verified valid digital signature.

11. The machine-readable medium of claim 8, further comprising:
instructions for verifying that a digital signature for the at least one object is associated with a trusted entity comprising:
instructions for comparing a public key associated with the digital signature for the at least one object with a provided public key of the trusted entity, the public key associated with the digital signature of the at least one object being verified as associated with the trusted entity when the comparing indicates that the public key associated with the digital signature for the at least one object is equal to the provided public key of the trusted entity.

12. The machine-readable medium of claim 8, further comprising:
instructions for verifying that a digital signature for the at least one object is associated with a trusted entity comprising:
instructions for comparing a public key associated with the digital signature for the at least one object with a public key of the trusted entity provided in a database or a well-protected container of an operating system, the public key associated with the digital signature for the at least one object being verified as associated with the trusted entity when the comparing indicates that the public key associated with the digital signature for the at least one object is equal to the public key of the trusted entity.

13. The machine-readable medium of claim 8, further comprising:
instructions for verifying that a digital signature for the at least one object is associated with a trusted entity comprising:
instructions for comparing a public key associated with the digital signature for the at least one object with a public key of the trusted entity provided by an application preparing to use the database, the public key associated with the digital signature for the at least one object being verified as associated with the trusted entity when the comparing indicates that the public key associated with the digital signature for the at least one object is equal to the provided public key of the trusted entity.

14. The machine-readable medium of claim 8, wherein:
each of the at least one object is one of a data object, a table object, a procedure object, a function object, a trigger object, a view object, or a binary code object, and
the instructions for verifying whether or not a digital signature associated with the at least one object is valid further comprise:
instructions for calculating a first object hash for the at least one object,
instructions for applying a public key of a previously computed digital signature for the at least one object to the previously computed digital signature for the at least one object to obtain a second object hash, and instructions for comparing the first object hash with the second object hash, the validity of the digital signature of the at least one object being verified when the comparing determines that the first object hash and the second object hash are equal.

15. A computer-implemented system comprising:
a processor coupled to a memory, the memory storing instructions which when executed cause the processor to perform the acts of:
verifying whether or not a digital signature associated with the at least one object defined in the database schema is valid;
determining that the at least one object defined in the database schema has been tampered with if the digital signature of the at least one object is determined to not be valid; and
to protect a software application that uses the database from malicious content, denying access to the at least one object based on a result of determination that the at least one object defined in the database schema has been tampered with.

16. The computer-implemented system of claim 15, wherein:
the digital signature is created using a private key associated with a public key, and
the verifying whether or not a digital signature associated with the at least one object is valid further comprises:
calculating a first object hash of the at least one object,
applying a public key to a previously computed digital signature for the at least one object to obtain a second object hash, and
comparing the first object hash with the second object hash, the validity of the digital signature of the at least one object being verified when the comparing determines that the first object hash and the second object hash are equal.

17. The computer-implemented system of claim 15, wherein:
the verifying whether or not a digital signature associated with the at least one object is valid further comprises
verifying the validity of a digital signature of each object of the at least one object, and
permitting access only to each object of the at least one object having a verified valid digital signature.

18. The computer-implemented system of claim 15, the memory further storing instructions which when executed cause the processor to perform the acts of:
verifying that a digital signature for the at least one object is associated with a trusted entity comprising:
comparing a public key associated with the digital signature for the at least one object with a provided public key of the trusted entity, the public key associated with the digital signature of the at least one object being verified as associated with the trusted entity when the comparing indicates that the public key associated with the digital signature for the at least one object is equal to the provided public key of the trusted entity.

19. The computer-implemented system of claim 15, the memory further storing instructions which when executed cause the processor to perform the acts of:
verifying that a digital signature for the at least one object is associated with a trusted entity comprising:
comparing a public key associated with the digital signature for the at least one object with a public key of the trusted entity provided in a database or a well-protected container of an operating system, the public key associated with the digital signature for the at least one object being verified as associated with the trusted entity when the comparing indicates that the public key associated with the digital signature for the at least one object is equal to the public key of the trusted entity.

20. The computer-implemented system of claim 15, the memory further storing instructions which when executed cause the processor to perform the acts of:
verifying that a digital signature for the at least one object is associated with a trusted entity comprising:
comparing a public key associated with the digital signature for the at least one object with a public key of the trusted entity provided by an application preparing to use the database, the public key associated with the digital signature for the at least one object being verified as associated with the trusted entity when the comparing indicates that the public key associated with the digital signature for the at least one object is equal to the provided public key of the trusted entity.

* * * * *